(12) United States Patent
Juniman

(10) Patent No.: US 6,268,601 B1
(45) Date of Patent: Jul. 31, 2001

(54) APPARATUS FOR DETERMING THE POSITION OF A ROTATING SHAFT

(75) Inventor: Jonathan Juniman, Harleysville, PA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/203,866

(22) Filed: Dec. 2, 1998

(51) Int. Cl.⁷ ........................................ G01D 5/34
(52) U.S. Cl. .................. 250/231.13; 250/231.18
(58) Field of Search ..................... 250/231.13, 231.14, 250/231.16, 231.17, 231.18, 229, 232, 233, 237 R, 214 B, 214 C; 341/13; 356/150, 375; 324/96

(56) References Cited

U.S. PATENT DOCUMENTS

| | | | |
|---|---|---|---|
| 4,781,742 | * 11/1988 | Hill et al. | 65/29.18 |
| 4,911,449 | * 3/1990 | Dickinson et al. | 463/20 |
| 5,650,613 | * 7/1997 | Lewis | 250/231.18 |
| 6,043,483 | * 3/2000 | Schreiber | 250/231.13 |

* cited by examiner

Primary Examiner—John R. Lee
Assistant Examiner—Kevin Pyo
(74) Attorney, Agent, or Firm—Anthony Miologos; Robert J. Black

(57) ABSTRACT

An apparatus is provided for determining the position of a shaft that is rotatably displaceable about a longitudinal axis. The apparatus includes a source of light energy, a light detecting device arranged adjacent the shaft. A rotatably displaceable disk having a triangular opening in the disk is mounted between the source of light energy and the light detecting device. A position-determining circuit connected to the light detecting device measures the magnitude of light that the light detecting device reads from the light emanating from the disk opening and applies the output to a position-determining scheme.

9 Claims, 3 Drawing Sheets

APPARATUS FOR DETERMING THE POSITION OF A ROTATING SHAFT

BACKGROUND OF THE INVENTION

The present invention relates generally to position determining devices and more particularly to an apparatus for determining the absolute position of a rotating shaft.

It is a common problem to want to know the position of a device whose position is being controlled by an actuator or some other means. For example, in the controls industry, devices such as valves, each having a valve stem or valve shaft which is rotatable by an actuator, are typically used to control the flow of liquids or various gasses associated with the industrial process. In these applications, it is a common need to know the precise absolute position of the controlled shaft or stem. This information allows for an improved understanding of the process and, subsequently, a more accurate control of the process by a process control system.

A number of prior solutions are known for measuring or determining this aforementioned position. One method is the use of linear variable differential transformers which can provide accurate positional information. However, they require a mechanical linkage to translate the positional information to a sensor and, additionally, consume a relatively high amount of power in their operation.

Slidewire, potentiometers, or other rotary transducers again require a mechanical link to the controlled device and also have the disadvantage of a sliding electrical contact which can cause long-term unreliability as well as having a potential for producing arcing and/or sparking, precluding the use of these devices in volatile environments.

Hall effect transducers, as they are currently used, generally require a mechanical linkage and are generally susceptible to ambient magnetic fields, electrostatic discharge, and other Electro-Magnetic Interference (EMI).

A more efficient form of solution is taught by my U. S. Pat. No. 5,828,060, which issued on Oct. 27, 1998 and is assigned to the same assignee as the present application.

Additionally, all of the aforementioned devices and methods require the use of extensive electronic circuitry to convert the predominately analog positional information to the digital signals normally required by modern computer-controlled industrial process control systems.

Therefore, it is the object of the present invention to provide a reliable position-determining apparatus that does not require a mechanical linkage between the apparatus and a rotatable shaft.

It is a further object of the present invention to provide a position-determining apparatus that has long-term reliability, is immune to EMI, and is cost effective.

It is a further object of the invention to provide a position-determining apparatus that exhibits the benefits of a greatly reduced parts count when interfacing the resultant positional signals to a computer-controlled industrial process control system.

SUMMARY OF THE INVENTION

The apparatus of the present invention contemplates the use of a light detecting device, and a rotatable disk having a single opening through the disk, where the rotatable disk is positionable between the light detecting device and a source of light energy. The center axis of the rotatable disk is aligned along the longitudinal axis of the shaft or valve stem of a suitable rotating device whose position is to be measured.

The rotatable disk includes an extended isosceles triangle having two curvilinear sides located on the disk in circumferential relationship to the shaft to be measured. The light detecting device responds to the magnitude of the distance between the two long sides of the triangle which increase in width longitudinally as the disk mounted upon the shaft is rotated.

The apparatus of the present invention includes a source of light energy which provides a constant source of light. The light detecting device is positionable in a first position adjacent the rotatable shaft and along a rotational center line of the disk where the aforementioned opening is located. The light detecting device is positioned opposite the light source on the opposite side of the disk arranged to produce a detection signal responsive to the detection of light energy.

The disk opening allows light from the light source to fall on the light detecting device, as the disk is rotated in a clockwise direction. The amount of light energy passed by the opening provides a form of modulation to the light detecting device. As the disk is rotated, the opening allows light to fall on the light detecting device, which produces the detection signal. As the disk is further rotated, the light detecting device receives more light. Upon further continued clockwise rotation of the disk, the opening allows more and more light from the light source to fall on the light detecting device, producing a detection signal of increased magnitude.

The signals are read by a shaft position-determining scheme whereby the signals are used to calculate the position of the shaft based on the amount of light measured by the light detecting device.

Thus, there is provided an apparatus for determining the position of a rotatable shaft and which offers long-term reliability, is immune to EMI, and is cost effective in its operation. The present invention requires sensed analog positional information to be translated into digital information, which is typically required by modern computer-controlled industrial process control systems.

It is noted that the present apparatus is a non-contact feedback mechanism with an assumed long-life expectancy and is immune to ambient magnetic fields while inherently self-correcting for drift in the analog parts due to temperature changes or aging of components.

As noted previously, the light source and the light detector are both positionable adjacent to the rotating disk. This positioning occurs by virtue of their being attached to a solenoid mechanism which is controllable from a central point to place the light source and the detector adjacent to the disk or withdraw both elements from their position adjacent to the disk until such time as measurement is required. Control of the solenoid would normally be under the control of the computer to which the read out of the light detecting device is applied as taught by the present invention.

BRIEF DESCRIPTION OF THE DRAWINGS

A better understanding of the present invention may be had by reading the following detailed description in conjunction with the drawings in which.

DETAILED DESCRIPTION OF THE INVENTION

Figure 1:
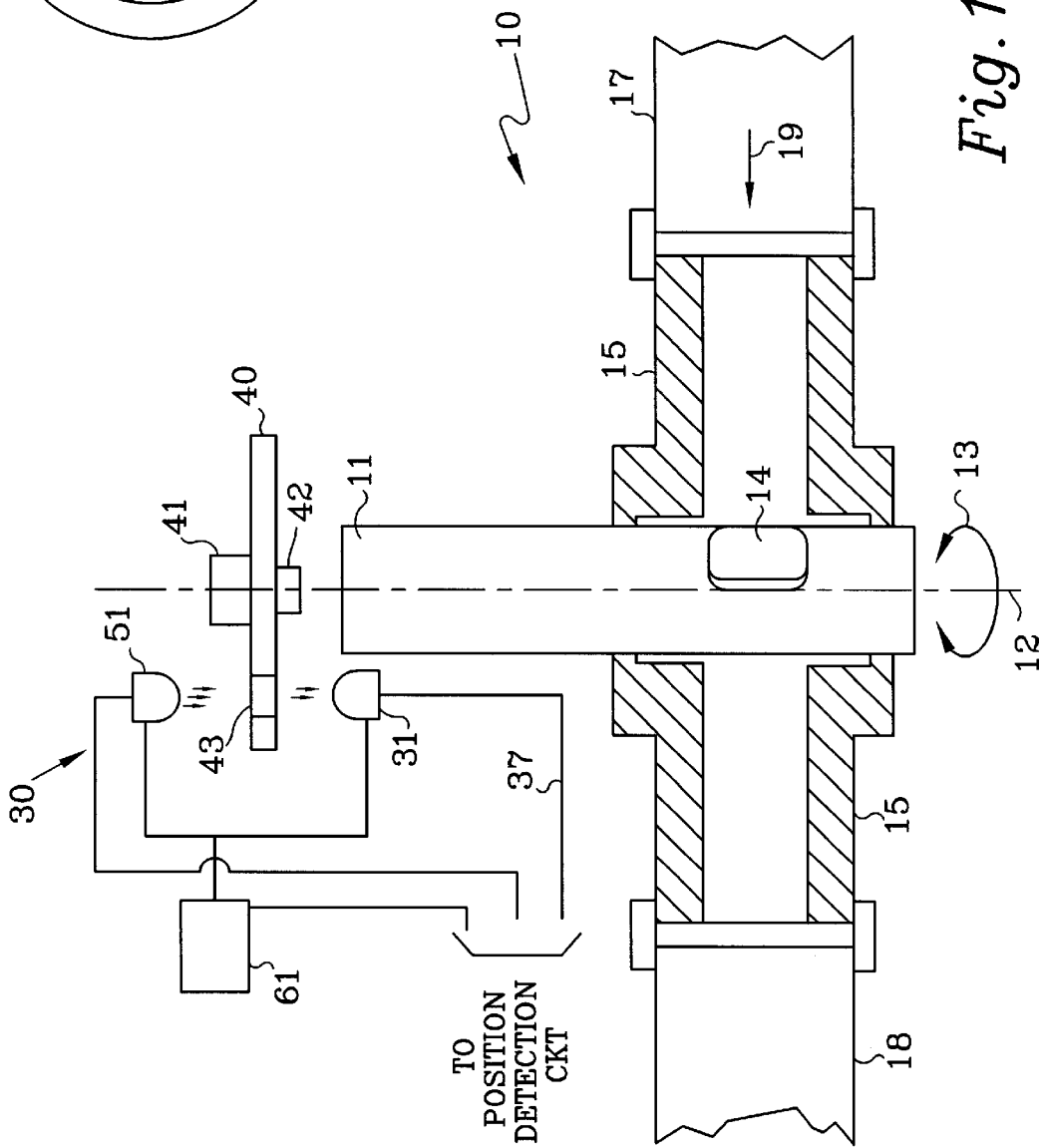
FIG. 1 shows the position detection apparatus of the present invention with the detection apparatus positioned adjacent to a rotatable valve shaft or stem.
Figure 3:
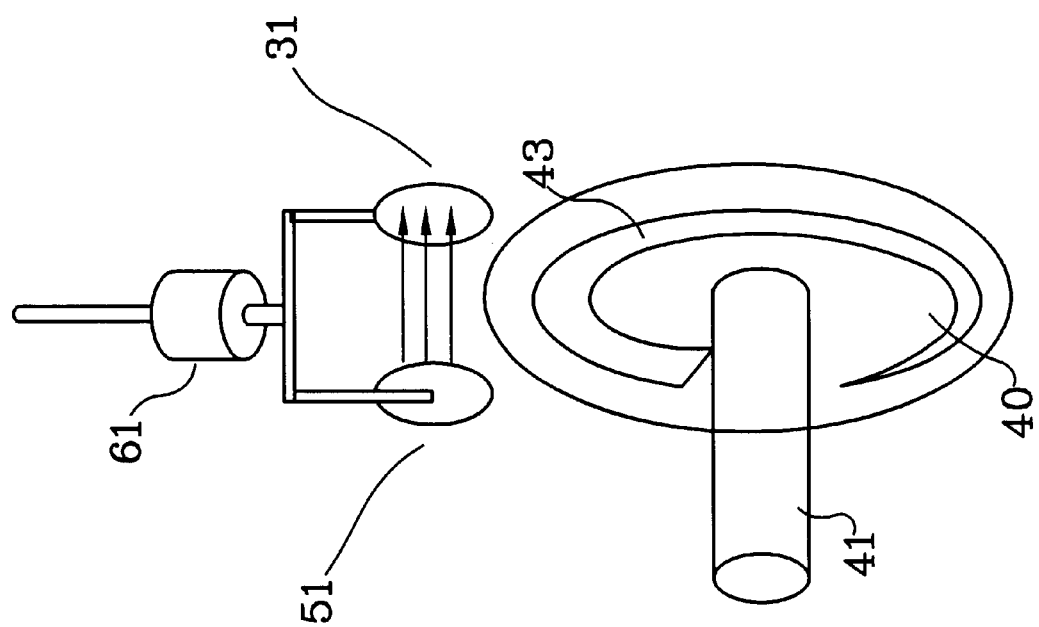
FIG. 3 shows the position detection apparatus of the present invention withdrawn from proximity to the valve having a rotatable valve shaft or stem.

A typical valve 10, where the present invention is used to advantage, is shown in FIG. 1. Valve 10 is comprised of a valve body 15, suitably connected on one end to a conduit 17 and on an opposite end to a conduit 18. A valve shaft 11 extends through valve body 15 and includes an opening or orifice 14 extending through the shaft. The valve shaft 11 is disposed to be rotatably displaceable along a longitudinal axis shown as 12, in the directions shown as 13. Typically, the valve shaft 11 controls the flow of a controlled medium such as a liquid, or a gas, from one side of the valve body 15 and conduit 17 to the opposite side of the valve body 15 and conduit 18. While the present invention is described as used with a rotating valve, its use is not so limited.

The method in which valve shaft 11 controls the flow of a controlled medium will now be explained. This explanation will be made with the flow of the controlled medium moving in the direction shown by arrow 19, or from conduit 17 to conduit 18. As will be understood by those skilled in the art, the controlled medium can also flow in the opposite direction, from conduit 18 to conduit 17. Valve shaft 11 will operate in the same manner with flow in either direction and is not limited thereto. The flow is controlled by rotating valve shaft 11 in either direction 13. When valve 10 is in a closed position, a solid surface of valve shaft 11 is presented to the normal direction of medium flow. Rotational displacement of the valve shaft 11 will progressively move the solid surface away from the medium allowing opening 14 to proportionally open from a partially-open position to a fully-open position.

It will be understood by those skilled in the art that when the solid surface of valve shaft 11 is presented to the controlled medium, the flow of the medium is effectively stopped from flowing through valve shaft 11 to conduit 18. Rotational displacement of the valve shaft 11 thereby presenting opening 14 to the medium, allows the medium to flow through the valve shaft 11 and to conduit 18. The amount of flow across the valve shaft 11 is controlled by the amount of opening 14 that is presented to the medium. A small presentation allows only a small amount of flow to occur, while the full presentation of opening 14 would allow a maximum amount of the controlled medium to flow. Therefore, the amount of flow between conduit 17 and conduit 18 is directly proportional to the rotational displacement of valve shaft 11. Valve shaft 11 can be either manually rotated by hand, or connected to an actuating device (not shown) which can rotatably displace valve shaft 11 responsive to positioning signals from a process control system.

It is desirable within the environment of a process control system to know at any given time the precise position of the valve shaft 11. Additionally, it is also desirable to be able to monitor the rotational displacement of valve shaft 11 as an actuator moves or displaces the valve shaft 11, for example, as when the flow of the controlled medium is required to be increased or decreased under control of the process control system. Further, many valve actuating devices require the precise position of the valve shaft be known as it is displaced. This position is normally communicated to the valve actuating device via a feedback signal. This feedback signal is used to gauge the progress of the valve shaft rotation in order to either increase or decrease rotation. This minimizes the over or under displacement of the shaft, or as it is more commonly known in the industry, the overshoot or undershoot, respectively.

The valve 10 just explained and shown by FIG. 1 is an example of the environment where the present invention can be used to advantage. It will be appreciated by those skilled in the art that the present invention can also be effectively used in other industrial control functions, such as to control furnace dampers and is not limited thereto.

Figure 2:
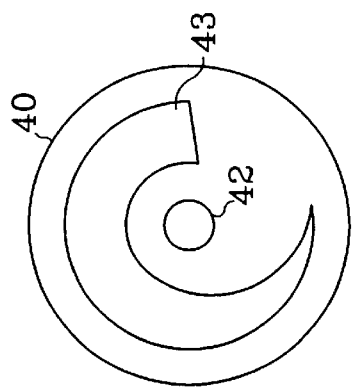
FIG. 2 shows the rotating disk as used in the present invention.

With continued reference to FIG. 1, and also with reference to FIG. 2, the apparatus for determining the position of a rotating shaft of the present invention is shown generally as 30. The apparatus 30 includes stationary light detecting device 31. As can be seen and understood, any rotatable displacement of valve shaft 11 will also displace light opening 43. Light detecting device 31 is any type of the currently-known devices, such as phototransistors, optical detectors, infrared detectors, and the like. These devices typically provide an output signal when light rays of a particular wavelength or spectrum are detected. The selection of the type of light detecting device used is dependent on the light source used, i.e., Light Emitting Diode (LED), infrared, or incandescent light and for purposes of this invention may be light detecting devices that detect light from any of the above-mentioned sources. The light detecting device 31 further includes a signal lead 37, which is connected to the position-detection circuit of the present invention.

A light directing disk 40 is rotatably mounted in front of valve shaft 11 and light detecting device 31. Light directing disk 40 is constructed of an opaque material and is mounted to a small electric motor 41 via the electric motor's shaft 42. Motor 41 is used to rotate shaft 11. The longitudinal axis of electric motor shaft 42 and the concentric center of disk 40 are aligned along the longitudinal axis 12 of valve shaft 11. Disk 40 further includes an opening 43, which traverses through disk 40. Opening 43 is located on disk 40 adjacent the perimeter edge of disk 40 in a position where, as the disk 40 is rotated, opening 43 will allow different amounts of light from source 51 to fall on light detecting device 31.

As noted above, the cutout 43 is located around the circumference of disk 40. When the disk is attached to the shaft, it will rotate. With the light source 51 and the light receiver 31 positioned on either side of the disk 40 as shown, light from the LED 51 shines through the triangular slot 43. The amount of light which reaches the photodetector 31 is directly proportional to the rotation angle of the shaft because the wider part of slot 43 will pass more light than the narrower parts do. The output of the photodetector 31 is then sent to a position detection circuit which includes and analog-to-digital converter.

As noted, the light source 51 and the light detected 31 are both connected to solenoid 61. The solenoid under control of the position detection circuit 70 is periodically actuated whereby the solenoid is retracted periodically moving the light source 51 and the light detector 31 away from disk 40. Accordingly, when the solenoid is retracted, the LED 51 can shine on the photodetector 31 directly. This reading can be used to indicate "span". In that manner, drift in the components is automatically compensated for.

$Y_{in}$=Reading of A to D converter when solenoid is extended.

$V_{ref}$=Reading of A to D converter when solenoid is retracted.

P=Position of the shaft.

$P_{max}$=Maximum rotation of the shaft.

$$V_{in}/V_{ref}=P/P_{max}$$

The apparatus of the present invention further includes a light source, which in this embodiment is shown to be annular. Light source is comprised of an LED 51. It should be understood that the form of light source 50 is only shown as an example to help understand the concepts of the present invention. It will be well understood by those skilled in the art that other forms or types of light sources can be substituted for the form and type of light source shown and the present invention is not limited thereto.

Light detecting device 31 is mounted adjacent to valve shaft 11. A rotation of valve shaft 11 along its longitudinal axis 12 would be translated by the width of the beam of light transmitted through opening 43 in disk 42 from light source 51 to light detecting device 31. Therefore, the location or position of valve shaft 11, at any one time, can be calculated by measuring the amount of light present at light detecting device 31.

Figure 4:
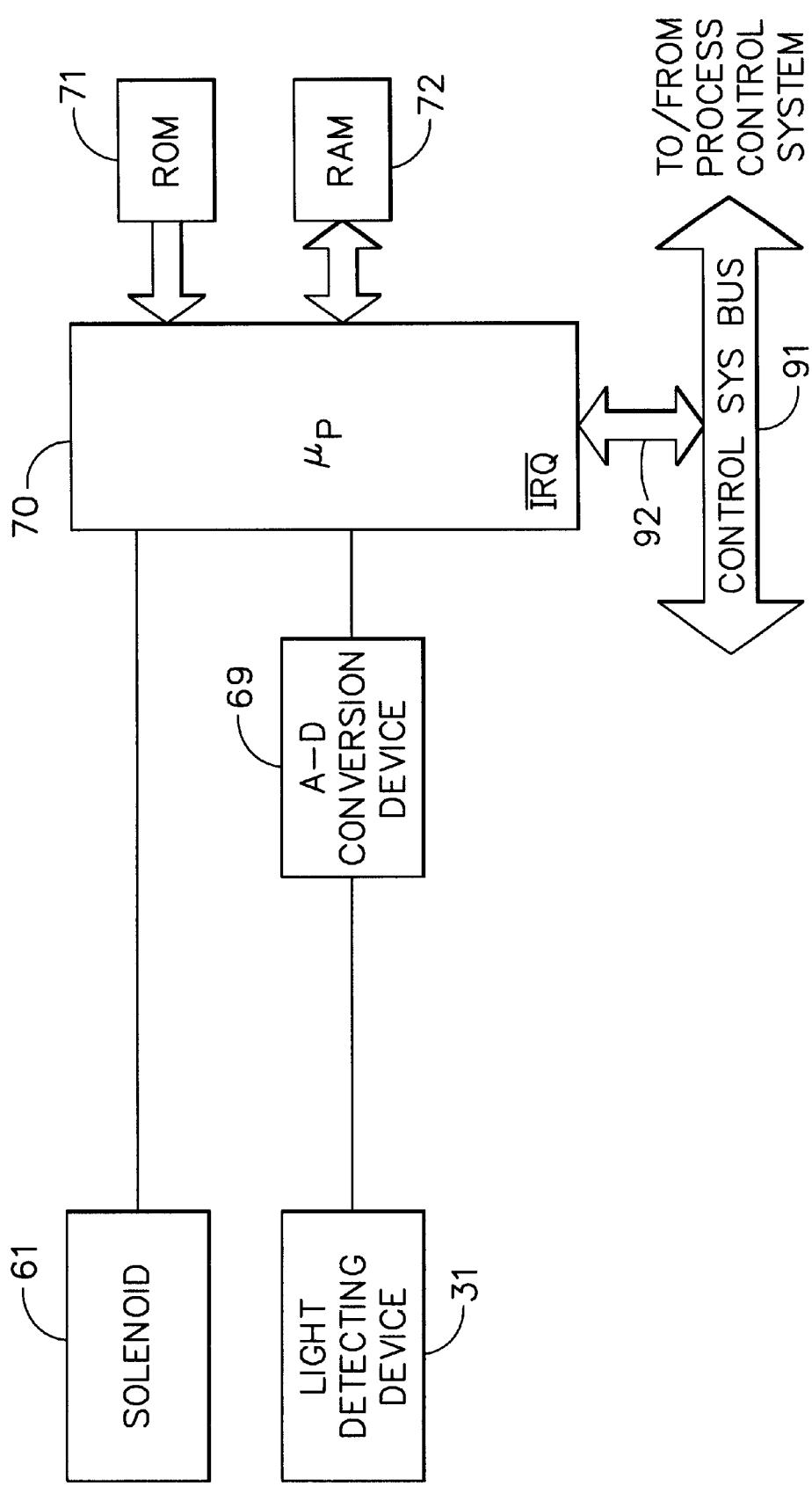
FIG. 4 shows a position determining circuit of the present invention used to calculate the position of the rotatable valve shaft or stem.

Turning now to FIG. 4, a position-determining circuit used to calculate the position of the rotatable valve shaft 11 is shown. As can be seen, an output signal from the device 31 will cause an output signal. The output of device 31 is connected to the input of an analog to digital (A-D) conversion device 69 that in turn connected to the microprocessor 70. Device 70 operates in association with analog to digital conversion device 69. A Read Only Memory (ROM) 71 is associated with microprocessor 70 and is used to store the operating program or processing instructions used by the microprocessor 70. A Random Access Memory (RAM) 72 is also associated with microprocessor 70 and is used as a memory store for the digital representation of the position of the valve shaft 11.

It is contemplated that the present invention will be used with a process control system (not shown) that includes a Control System BUS 91 that is connected to microprocessor 70 via communications BUS 92. The process control system will from time to time poll microprocessor 70, operate the solenoid 61 and request transmission to the process control system of the stored digital data representing the position of the valve shaft 11. However, it will be understood by those skilled in the art that microprocessor 70 could also be connected to the local controller of a valve actuating system, thereby providing feedback signal representing the valve's position as the valve is rotated to a desired position. Further, ROM 71 and RAM 72 could also be integral and an internal component of microprocessor 70 as is commonly found in the class of devices called microcontrollers. ROM 71 and RAM 72 are shown here external to device 70 to better explain the way in which the invention is used to advantage.

With renewed reference to FIGS. 1, 2 and FIG. 4, an explanation of the operation of the position-determining circuit as used to advantage in the present invention will now be made.

As disk 40 rotates, for purposes of this embodiment in a clockwise direction, it will encounter light detecting device 31 first. When the light beam emanating from source 51 (through disk 40 opening 43) strikes light detecting device 31, light detecting device 31 turns on, causing it to 69 send its output signal to the input of microprocessor 70. Microprocessor 70 then polls its I/O ports for an input signal. Microprocessor 70, upon detection of this detection device signal, operates an included A-D device 69 to gain a digital output.

Under control of an operating routine, the apparatus can measure, calculate, and update shaft travel on a periodic basis replacing the old data with new data. Alternatively, the position of the shaft 11 can be determined on a demand basis or when requested by a process control system. When the process control system issues a request for the latest value of shaft travel, the data is transferred via communication BUS 92 to control system BUS 91 and to a central controller of the process control system. The process control system can then translate the value received into an absolute position of the valve shaft position for display to a human operator or used as process variable in a process controlling routine. It will be appreciated by those skilled in the art that the value of shaft travel measured and calculated by the present invention can also be output to the controller of a valve shaft actuating device where it is used as a feedback signal indicating the present position of the shaft as it is being rotated by the actuator.

It must be understood that an alternative way to manufacture the disk is to print a linearly increasing grayscale on a clear disk which would function much the same manner passing minimum and maximum amounts of light depending upon the amount of gray present. While there may be certain economic advantages to this approach, it may be possible it could be affected by the accumulation of dirt or other clouding effects on the disk itself.

The present invention has been described with particular reference to the preferred embodiment thereof. It will be obvious that various changes and modifications may be made therein without departing from the spirit and scope of the invention as defined in the appended claims.

What is claimed is:

1. An apparatus for determining the position of a shaft rotatably displaceable along a longitudinal axis, comprising:

a source of light energy positioned on said apparatus in a first position adjacent to said shaft;

detecting means positioned on said apparatus in a first position adjacent said shaft, said detecting means arranged to produce first and second output signals responsive to the detection of said light energy from said source of light energy;

light energy directing means interposed between said source of light energy and said detecting means, said light energy directing means arranged to be rotated in association with said shaft to expose variable amounts of light energy to said detecting means, said detecting means producing said first output signal based on the magnitude of light energy detected and representative of the rotational displacement of said shaft;

determining means arranged to receive said first and said second output signals, whereby in response to the magnitude of said first output signal said determining means determines the position of said shaft along said longitudinal axis displacement means mechanically mounted to said source of light energy and said light energy detecting means and under control of said determining means said displacement means periodically moves said source of light energy and said light energy detecting means into a second position distant from said shaft, whereby said light energy detecting means produces said second output signal and said directing means receives and uses said second output signal to determine and compensate for drift in said apparatus.

2. The apparatus of claim 1, wherein said source of light energy generates light energy in a specific wavelength and said detecting means is comprised of a light energy detecting device arranged to produce said first and said second output signals responsive to the detection of light energy of said specific wavelength.

3. The apparatus of claim 1, wherein said apparatus further includes rotation means mounted about a rotational center line of said shaft and said light energy directing means comprises:

an opaque disk mounted to said rotation means, the concentric center of said disk aligned along said rotational center line;

a triangular opening with two curvilinear sides extending through said opaque disk and arranged adjacent said rotational center line, whereby said rotation means simultaneously rotates said disk and said shaft allowing said opening to travel about said rotational center line exposing variable amounts of light energy to said detecting means.

4. The apparatus of claim 1, wherein said apparatus determining means comprises at least:

a microprocessor including A-D conversions means for receiving said first and second detection signals;

a memory store connected to said microprocessor; and, under control of said microprocessor said A-D conversion means converts said first output signal into first digital data representative of the magnitude of said first output signal, for storage in said memory store, and coverts said second output signal into second digital data representative of the second output signal for storage in said memory store.

5. The apparatus of claim 4, wherein said determining means further includes:

a position-determining scheme stored in said memory store and, responsive to said position-determining scheme said microprocessor retrieves said first digital data from said memory store and utilizes said first digital data with said position-determining scheme and said position-determining scheme calculates the position of said shaft along said longitudinal axis and stores said position in said memory store.

6. The apparatus of claim 4, wherein said determining means further includes:

an apparatus drift compensation scheme stored in said memory store and responsive to said apparatus drift compensation scheme said microprocessor periodically retrieves said first and said second digital data from said memory store and utilizes said first and said second digital data with said apparatus drift compensation scheme to calculate and compensate for drift of the components of the apparatus.

7. The apparatus of claim 6 wherein said displacement means comprises a movable solenoid actuator mechanically connected to said source of light energy and said detection means, and said microprocessor further including an output electrically connected to said solenoid, whereby under control of said drift compensation scheme, said microprocessor outputs to said solenoid a retraction signal, activating said solenoid to move said source of light energy and said detection means into said second position.

8. The apparatus of claim 6, wherein said apparatus drift compensation scheme calculates "span" in accordance to:

$$V_{in}/V_{ref}=P/P_{max}$$

wherein, $V_{in}$=the value of said first digital data $V_{ref}$=the value of said second digital data P=calculated position of the shaft $P_{max}$=the maximum rotation of the shaft along the longitudinal center line.

9. An apparatus for determining the position of a shaft rotatably displaceable along a longitudinal axis, comprising:

a light source positioned in a first position adjacent to said shaft;

a light detector positioned in a first position adjacent to said shaft and arranged to receive the light energy from said light source and to produce first and second output signals responsive to the detection of said light energy;

light energy directing means interposed between said light source and said light detector, said light energy directing means arranged to rotate in association with the rotation of said shaft to expose a variable magnitude of light energy to said light detector, said light detector producing said first output signal based on the magnitude of the light energy detected and representative of the rotational displacement of said shaft;

determining means arranged to receive said first and said second output signals, whereby in response to the magnitude of said first output signal, said determining means determines the position of said shaft along said longitudinal axis; and displacement means mechanically connected to said light source and said light detector and under control of said determining means, said displacement means periodically moves said light source and said light detector into a second position distant from said shaft, whereby said light detector produces said second output signal and said determining means receives and uses said second output signal to determine and compensate for drift in said apparatus.

\* \* \* \* \*